(12) United States Patent
Sato et al.

(10) Patent No.: US 11,080,173 B2
(45) Date of Patent: Aug. 3, 2021

(54) BOUNDARY SEARCH TEST SUPPORT DEVICE AND BOUNDARY SEARCH TEST SUPPORT METHOD

(71) Applicant: Hitachi, Ltd., Tokyo (JP)

(72) Inventors: Naoto Sato, Tokyo (JP); Tomoyuki Myojin, Tokyo (JP); Hironobu Kuruma, Tokyo (JP); Yuichiroh Nakagawa, Tokyo (JP); Hideto Noguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 288 days.

(21) Appl. No.: 16/245,367

(22) Filed: Jan. 11, 2019

(65) Prior Publication Data

US 2019/0220388 A1   Jul. 18, 2019

(30) Foreign Application Priority Data

Jan. 18, 2018   (JP) .............................. JP2018-006202

(51) Int. Cl.
  *G06F 11/36*   (2006.01)
  *G06K 9/62*   (2006.01)
  (Continued)

(52) U.S. Cl.
  CPC .......... *G06F 11/3688* (2013.01); *G06K 9/481* (2013.01); *G06K 9/6204* (2013.01);
  (Continued)

(58) Field of Classification Search
  CPC .......... G06N 20/00; G06N 3/02; G06K 9/481; G06K 9/6204; G06K 9/621; G06K 2209/01
  See application file for complete search history.

(56) References Cited

U.S. PATENT DOCUMENTS

| | | | | |
|---|---|---|---|---|
| 5,276,771 A | * | 1/1994 | Manukian | ............... G06K 9/627 |
| | | | | 706/25 |
| 5,542,006 A | * | 7/1996 | Shustorovich | ........... G06K 9/32 |
| | | | | 382/156 |

(Continued)

FOREIGN PATENT DOCUMENTS

JP    6067643 B2    1/2017

OTHER PUBLICATIONS

Zhou et al ;"Recognition of handwritten numerals by Quantum Neural Network with fuzzy features";7pages (Year: 1999).*

(Continued)

*Primary Examiner* — Wei Y Zhen
*Assistant Examiner* — Brahim Bourzik
(74) *Attorney, Agent, or Firm* — Mattingly & Malur, PC

(57) ABSTRACT

The boundary search test support device includes: a storage device that holds a plurality of input vectors; and an arithmetic device that executes a test by sequentially inputting the input vectors to a program generated by a neural network and acquiring output vectors which are test results, respectively generates, in a coordinate system which takes each of a predetermined plurality of elements among elements constituting the output vectors as a coordinate axis, a straight line in which the plurality of elements has a same value and a hyperplane in which a sum of values of the plurality of elements is taken as a predetermined value, and arranges a most antagonistic point and boundary vectors whose values of the elements rank higher than or equal to a predetermined ranking among the output vectors in the coordinate system, and outputs the coordinate system together with input vectors corresponding to the boundary vectors.

10 Claims, 15 Drawing Sheets

(51) Int. Cl.
  *G06N 3/02*  (2006.01)
  *G06N 20/00* (2019.01)
  *G06K 9/48*  (2006.01)

(52) U.S. Cl.
  CPC ............. *G06K 9/6215* (2013.01); *G06N 3/02* (2013.01); *G06N 20/00* (2019.01); *G06K 2209/01* (2013.01)

(56) References Cited

U.S. PATENT DOCUMENTS

| | | | | |
|---|---|---|---|---|
| 5,546,503 | A | * | 8/1996 | Abe ................ G06K 9/6281 706/25 |
| 5,912,986 | A | * | 6/1999 | Shustorovich ......... G06K 9/344 382/156 |
| 6,028,956 | A | * | 2/2000 | Shustorovich ....... G06K 9/3233 382/156 |
| 2016/0189010 | A1 | * | 6/2016 | Tang .................. G06K 9/627 382/113 |
| 2017/0220904 | A1 | * | 8/2017 | Bai .................. G06K 9/4604 |
| 2019/0114511 | A1 | * | 4/2019 | Gao .................. G06K 9/6257 |
| 2019/0325308 | A1 | * | 10/2019 | Chung ................ G06F 40/44 |

OTHER PUBLICATIONS

Melkhovetal et al ;"Image Patch Matching Using Convolutional Descriptors with Euclidean Distance";16 pages (Year: 2017).*
Zhou et al ;"A high performance hand-printed Numeral Recognition system with verification module";5 pages (Year: 1997).*
Wang et al ;"Classification Visualization with Shaded Similarity Matrix"; 9 pages (Year: 2002).*
Makkar et al ;"Analogizing Time Complexity of KNN and CNN in Recognizing Handwritten Digits"; 6pages (Year: 2017).*
Extended European Search Report received in corresponding European Application No. 19151825.7 dated Jun. 14, 2019.
Alsallakh, B. et al., "Do Convolutional Neural Networks Learn Class Hierarchy?", Cornell University Library, Oct. 17, 2017, pp. 1-11.
Rauber, P. E. et al., "Visualizing the Hidden Activity of Artificial Neural Networks", IEEE Transactions on Visualization and Computer Graphics, Jan. 1, 2017, pp. 101-110, vol. 23, No. 1.
Mathieu, A. et al., "Understanding Deep Features with Computer-Generated Imagery", 2015 IEEE International Conference on Computer Vision, Dec. 7, 2015, pp. 2875-2883.
Denker, J.S. et al., "Transforming Neural-Net Output Levels to Probability Distributions", Nov. 20, 1990, URL: http://yann.lecun.com/exdb/publis/pdf/denker-lecun-91.pdf.

* cited by examiner

INPUT VECTOR                                           1111

| CASE | INPUT VECTOR | EXPECTED OUTPUT VALUE |
|------|--------------|------------------------|
| 1    | test1001.dat | 1                      |
| 1    | test1002.dat | 1                      |
| ...  |              |                        |
| 2    | test2001.dat | 1                      |
| 2    | test2002.dat | 1                      |
| ...  |              |                        |
| 3    | test3001.dat | 7                      |
| 3    | test3002.dat | 7                      |
| ...  |              |                        |
| 4    | test4001.dat | 7                      |
| 4    | test4002.dat | 7                      |
| ...  |              |                        |

OUTPUT VECTOR                 1141

(0.04, 0.31, 0.05, 0.09, 0.01, 0.07, 0.02, 0.36, 0.04, 0.01)

PROBABILITY THAT THE IMAGE IS 1          PROBABILITY THAT THE IMAGE IS 7

FIG. 11

BOUNDARY VECTOR SERIES

| SERIES DIRECTION | SERIES NUMBER | SERIES INDEX | VALUE OF OUTPUT VECTOR | NUMBER OF CORRESPONDING INPUT VECTOR |
|---|---|---|---|---|
| (+, +) | 1 | 1 | (0.04, 0.31, 0.05, 0.09, 0.01, 0.07, 0.02, 0.36, 0.04, 0.01) | 1 |
| | | 2 | (0.03, 0.33, 0.04, 0.09, 0.01, 0.07, 0.02, 0.39, 0.01, 0.01) | 2 |
| | | 3 | (0.03, 0.34, 0.03, 0.06, 0.01, 0.07, 0.02, 0.42, 0.01, 0.01) | 6 |
| | 2 | 1 | (0.04, 0.31, 0.05, 0.09, 0.01, 0.07, 0.02, 0.36, 0.04, 0.01) | 1 |
| | | 2 | (0.04, 0.32, 0.04, 0.09, 0.01, 0.07, 0.02, 0.37, 0.03, 0.01) | 43 |
| | | 3 | (0.04, 0.40, 0.04, 0.01, 0.01, 0.04, 0.02, 0.40, 0.03, 0.01) | 812 |
| | ... | | | |
| (+, −) | 1 | 1 | (0.04, 0.31, 0.05, 0.09, 0.01, 0.07, 0.02, 0.36, 0.04, 0.01) | 1 |
| | | 2 | (0.04, 0.33, 0.03, 0.09, 0.01, 0.07, 0.02, 0.35, 0.05, 0.01) | 32 |
| | | 3 | (0.04, 0.35, 0.01, 0.09, 0.01, 0.07, 0.02, 0.33, 0.07, 0.01) | 643 |
| | | 4 | (0.02, 0.37, 0.01, 0.09, 0.01, 0.07, 0.05, 0.30, 0.07, 0.01) | 223 |
| | ... | | | |
| (−, +) | ... | | | |
| (−, −) | ... | | | |

1221

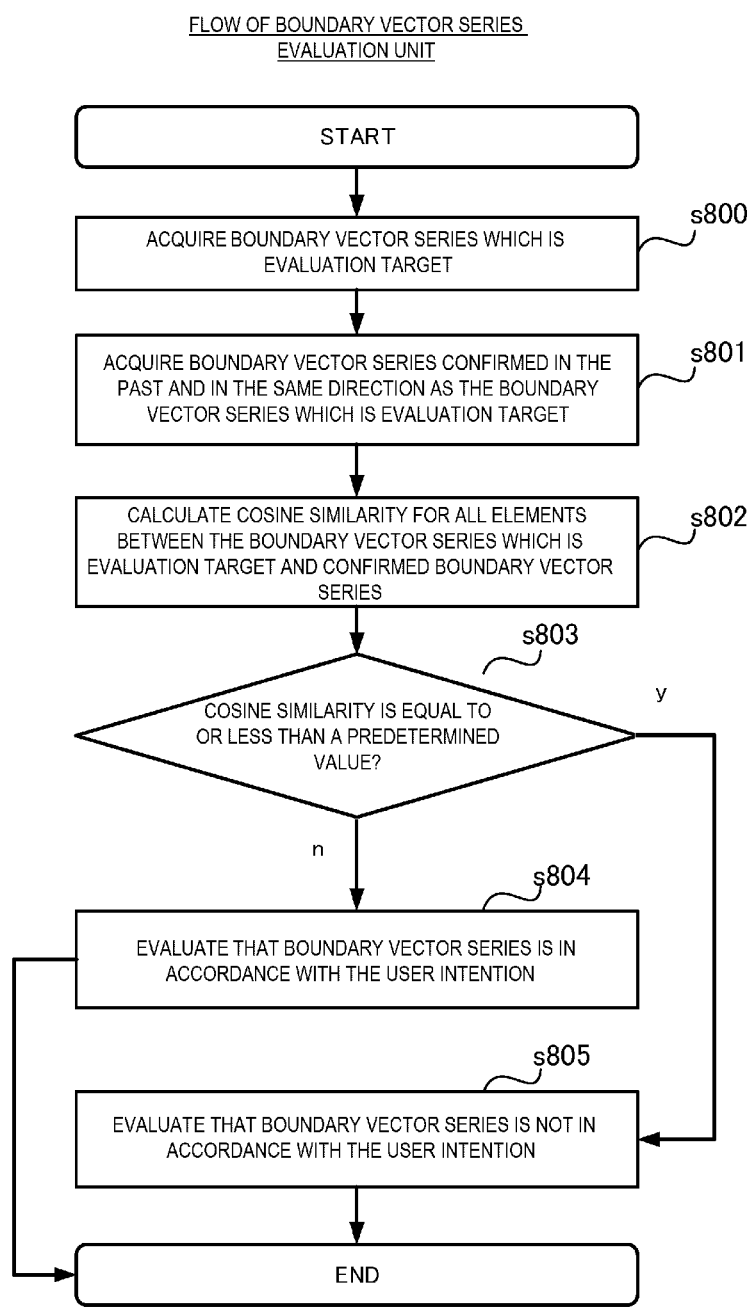

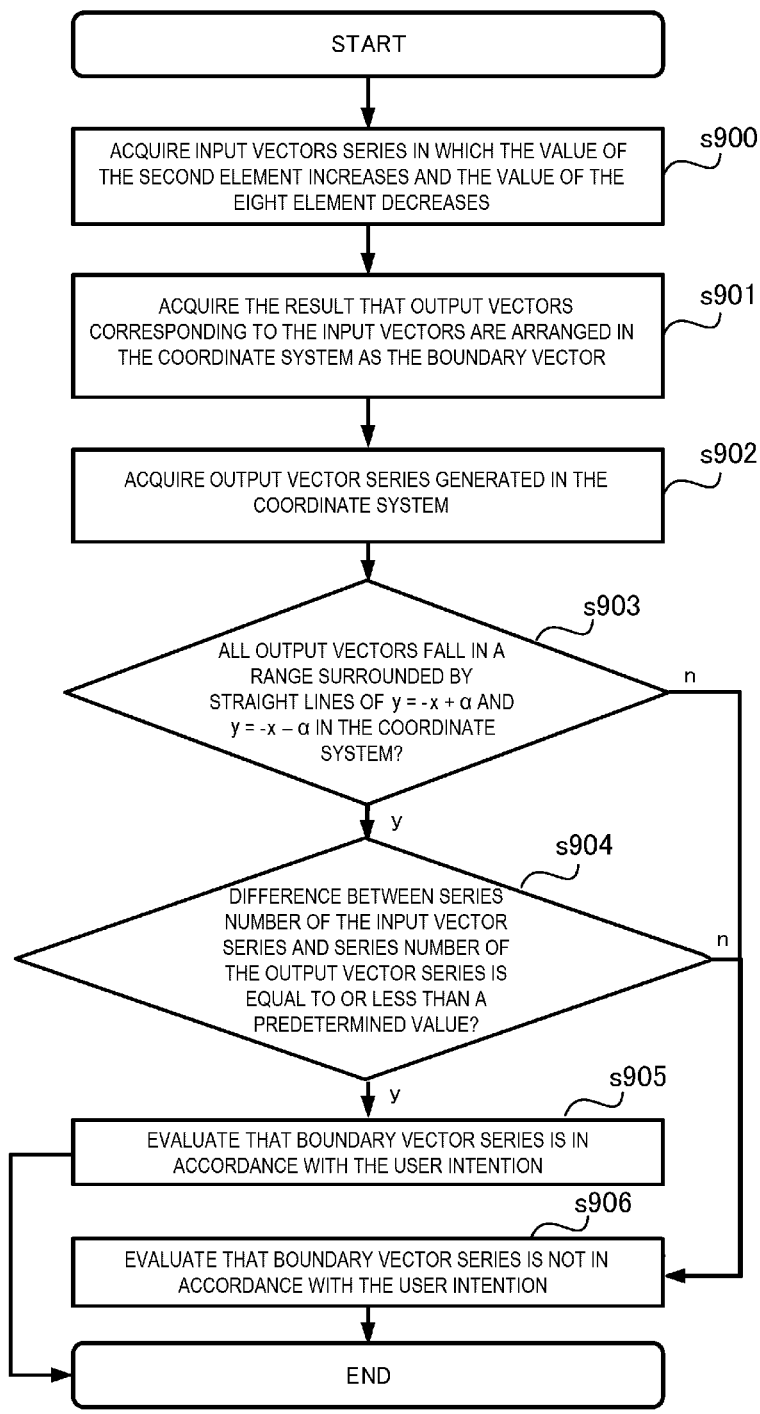

BOUNDARY SEARCH TEST SUPPORT DEVICE AND BOUNDARY SEARCH TEST SUPPORT METHOD

CROSS-REFERENCE TO RELATED APPLICATIONS

The present application claims priority pursuant to 35 U.S.C. § 119 from Japanese Patent Application No. 2018-006202, filed on Jan. 18, 2018, the entire disclosure of which is incorporated herein by reference.

BACKGROUND

The present invention relates to a boundary search test support device and a boundary search test support method, and specifically relates to a technology in which it is possible to efficiently detect boundary points at which output values change in a program created by machine learning.

In a related program test, a boundary value test focusing on boundary points at which output values change is effective as a method to detect bugs (that expected output cannot be acquired with respect to a certain input) that are difficult to detect.

The boundary points are basically extracted from a technical specification. However, when the technical specification is absent, the boundary points at which the output values change may be extracted from a source code by using the feature of "the boundary points at which the output values change are implemented by conditional branches such as IF statements".

As a related technique related to inspection of such boundary points, a test data generation device (see Japanese Patent No. 6067643) and the like has been proposed. The test data generation device that generates test data for a design document in which system design information is described, includes: a design model extraction unit configured to extract a design model from a design document; a test model construction unit configured to construct a test model which is a set of test items causing a specific result to the design model; a first constraint equation configured to ensure that, for a test item of the test model, test data is a boundary value of the boundary being focused by an equivalence class; a second constraint equation configured to ensure that test data is not a boundary value of a boundary not being focused by an equivalence class; a constraint equation construction unit configured to construct a constraint equation set to which a constraint equation is added which ensures a constraint condition of the boundary not being focused is satisfied; a constraint equation solution unit configured to solve a constraint equation in the constraint equation set and to acquire test data; a test model and test data output unit configured to output the test model and the test data, in which the first constraint equation includes a third constraint equation configured to ensure that test data is a point on an equation representing a set of endpoints of the boundary being focused and a fourth constraint equation configured to ensure that test data is a point on a nearest equation of the set of end points of the boundary being focused, and the second constraint equation includes a fifth constraint equation configured to ensure that test data is not a point on an equation representing a set of endpoints of the boundary being not focused and a sixth constraint equation configured to ensure that test data is not a point on a nearest equation of the set of endpoints of the boundary not being focused.

However, in the case of a program created by machine learning such as a neural network, it is difficult to clearly define a boundary of output values as a technical specification.

For example, in the case of a numeral recognition program, it is difficult to clearly specify the boundary between "1" and "7" as the technical specification. Unlike a related procedural program, in the program created by machine learning, output values are changed by a parameter called "weight" or "bias" instead of a conditional branch. Therefore, it is difficult to extract boundary points from a source code.

In other words, it is difficult to inspect boundary points at which output values change with respect to the program created by machine learning.

SUMMARY

An object of the invention is to provide a technique in which it is possible to efficiently detect boundary points at which output values change in the program created by machine learning.

A boundary search test support device according to the invention includes: a storage device configured to hold a plurality of predetermined input vectors; and an arithmetic device configured to execute a processing of acquiring the plurality of input vectors from the storage device, executing a test by sequentially inputting the input vectors to a program generated by a neural network, and acquiring output vectors which are test results corresponding to the input vectors, a processing of respectively generating, in a coordinate system which takes each of a predetermined plurality of elements among elements constituting the output vectors as a coordinate axis, a straight line in which the plurality of elements has a same value and a hyperplane in which a sum of values of the plurality of elements is taken as a predetermined value, and a processing of arranging a most antagonistic point which is an intersection point of the straight line and the hyperplane and boundary vectors whose values of the plurality of elements rank no lower than a predetermined ranking among the output vectors in the coordinate system, and displaying the coordinate system together with input vectors corresponding to the boundary vectors on a predetermined output device.

According to a boundary search test support method of the invention, an information processing device including a storage device configured to hold a plurality of predetermined input vectors executes: a processing of acquiring the plurality of input vectors from the storage device, executing a test by sequentially inputting the input vectors to a program generated by a neural network, and acquiring output vectors which are test results corresponding to the input vectors, a processing of respectively generating, in a coordinate system which takes each of a predetermined plurality of elements among elements constituting the output vectors as a coordinate axis, a straight line in which the plurality of elements has a same value and a hyperplane in which a sum of values of the plurality of elements is taken as a predetermined value, and a processing of arranging a most antagonistic point which is an intersection point of the straight line and the hyperplane and boundary vectors whose values of the plurality of elements rank no lower than a predetermined ranking among the output vectors in the coordinate system, and displaying the coordinate system together with input vectors corresponding to the boundary vectors on a predetermined output device.

According to the invention, the possibility of efficiently detecting boundary points at which output values change in a program created by machine learning can be increased.

BRIEF DESCRIPTION OF DRAWINGS

FIG. 11 is a diagram illustrating an example of boundary vector series according to the embodiment;

FIG. 14 is a diagram illustrating an exemplary flow 8 of the boundary search test support method according to the embodiment; and FIG. 15 is a diagram illustrating an exemplary flow 9 of the boundary search test support method according to the embodiment.

DETAILED DESCRIPTION OF THE EMBODIMENTS

—Functional Configuration of Boundary Search Test Support Device—

Figure 1:
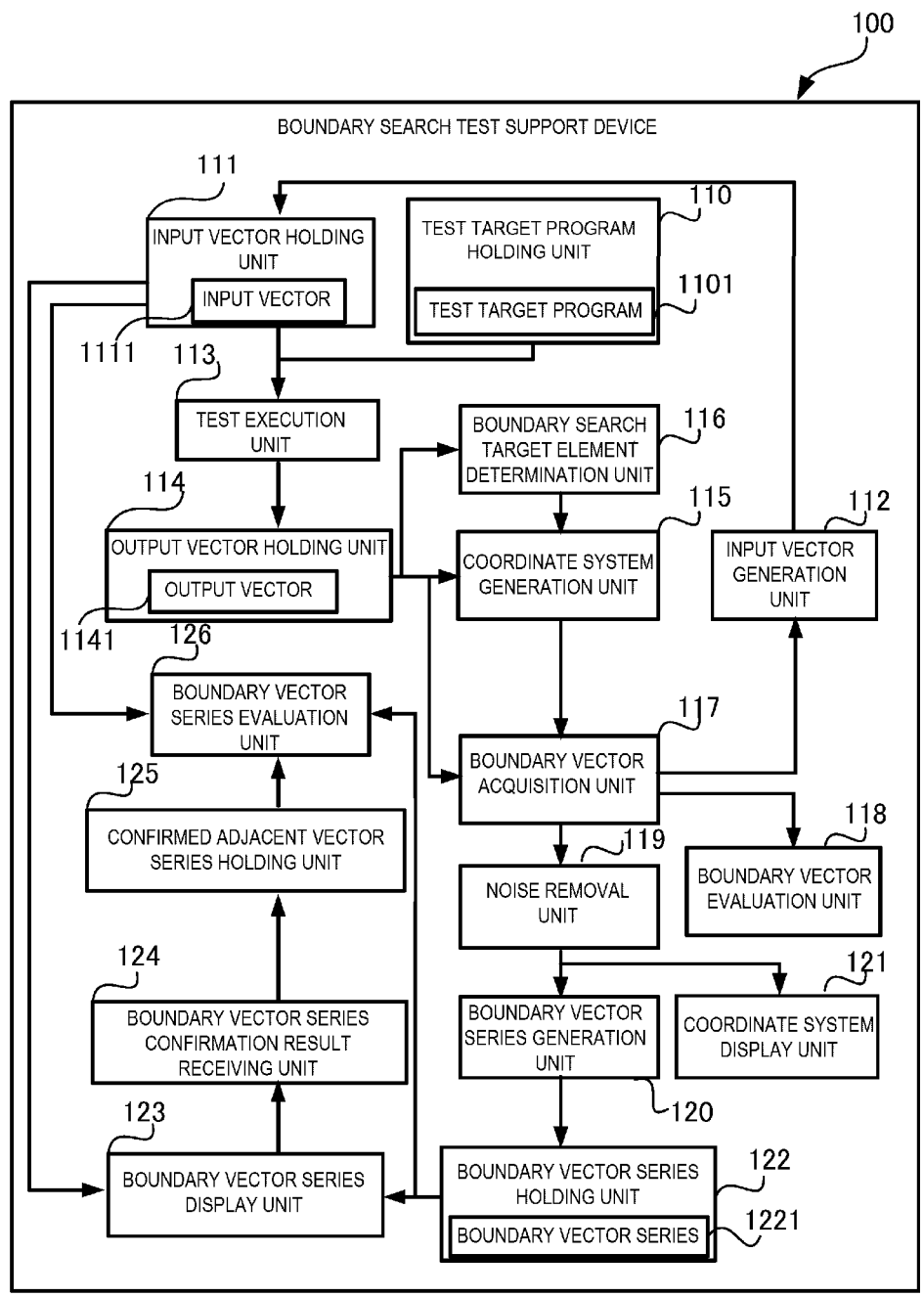
FIG. 1 is a diagram illustrating an exemplary configuration of a boundary search test support device according to an embodiment.

Hereinafter, an embodiment of the invention will be described in detail with reference to drawings. FIG. 1 is a diagram illustrating an exemplary configuration of a boundary search test support device 100 according to the embodiment. The boundary search test support device 100 shown in FIG. 1 is a computer device capable of efficiently detecting boundary points at which output values change in a program created by machine learning.

The boundary search test support device 100, as shown in FIG. 1, includes a test target program holding unit 110, an input vector holding unit 111, an input vector generation unit 112, a test execution unit 113, an output vector holding unit 114, a coordinate system generation unit 115, a boundary search target element determination unit 116, a boundary vector acquisition unit 117, a boundary vector evaluation unit 118, a noise removal unit 119, a boundary vector series generation unit 120, a coordinate system display unit 121, a boundary vector series holding unit 122, a boundary vector series display unit 123, a boundary vector series confirmation result receiving unit 124, a confirmed adjacent vector series holding unit 125, and a boundary vector series evaluation unit 126. These are functional units that are implemented by cooperating programs and hardware of the boundary search test support device 100.

Among these, the test target program holding unit 110 holds a test target program 1101. The test target program 1101 is created by a neural network. In the embodiment, an image recognition program is assumed as an example of the test target program 1101.

The input vector holding unit 111 holds input vectors 1111. The input vectors 1111 are constituted by test input values generated for certain expected output values. In the embodiment, the input vectors assumed as an example are input vectors in which image data displaying numbers are taken as test input values and expected numbers, which are numbers to be recognized when the test input values are input to the image recognition program, are taken as expected output values.

The input vector generation unit 112 generates the input vectors 1111 by an appropriate technique such as a morphing technique or receives designation of test input values from a user, and reflects the designation in the input vectors 1111. Therefore, when the input vectors 1111 are image data, the input vector generation unit 112 generates, by the morphing technology described above, an input vector series in which the value of a predetermined first element of target elements gradually increases and the value of a predetermined second element of the target elements gradually decreases, and stores the input vector series in the input vector holding unit 111.

The test execution unit 113 inputs the input vectors 1111 to the test target program 1101 as inputs, and acquires output vectors which are output values of the input vectors 1111. In test execution, the test execution unit 113 may acquire information (neuron information) of each neuron in each layer in the test target program 1101.

The output vector holding unit 114 holds output vectors 1141 obtained by the test executed by the test execution unit 113. Details of the output vectors 1141 will be described below (FIG. 3).

Figure 5:
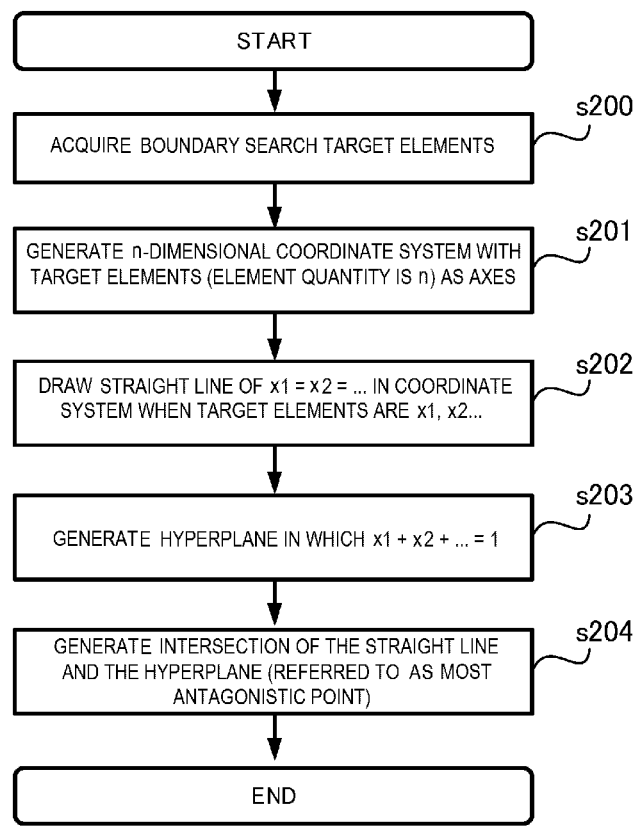
FIG. 5 is a diagram illustrating an exemplary flow 2 of the boundary search test support method according to the embodiment.

The coordinate system generation unit 115, based on the output vectors 1141 corresponding to the input vectors 1111 of the input vector holding unit 111, generates a coordinate system which takes each of a predetermined plurality of elements (hereinafter referred to as target elements) among elements constituting the output vectors 1141 as a coordinate axis, generates respectively a straight line in which the target elements have the same value and a hyperplane in which the sum of the values of the target elements is taken as a predetermined value in this coordinate system, and generates a most antagonistic point which is an intersection of the straight line and the hyperplane (FIG. 5).

Figure 4:
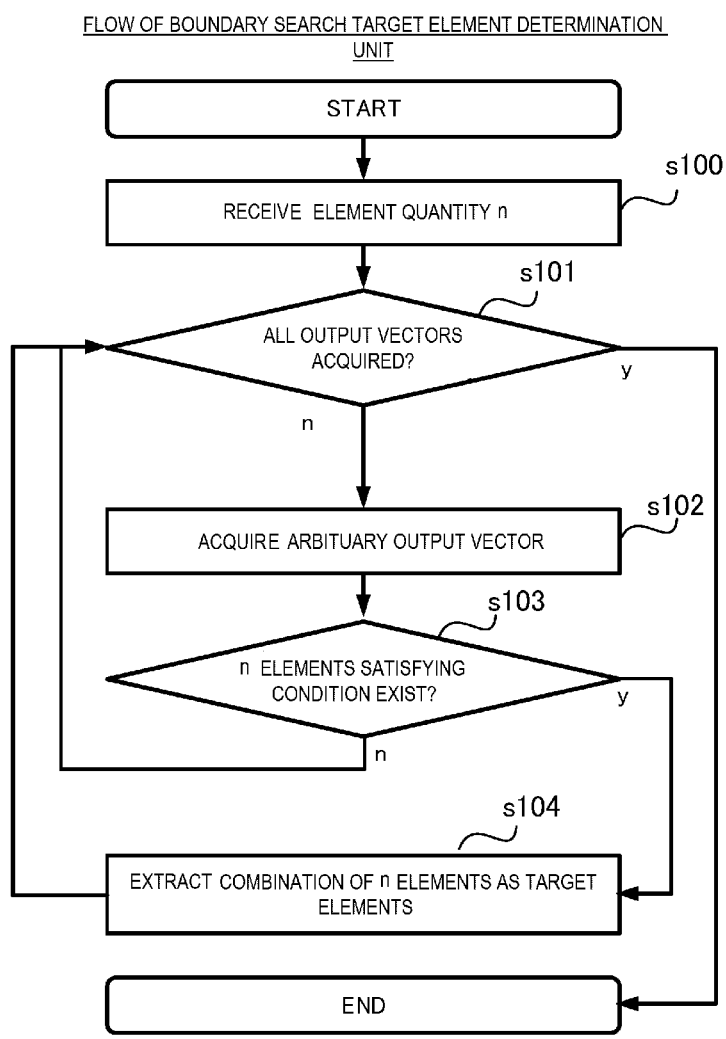
FIG. 4 is a diagram illustrating an exemplary flow 1 of a boundary search test support method according to the embodiment.

The boundary search target element determination unit 116 refers to the output vectors 1141 of the output vector holding unit 114, specifies merely a predetermined number (for example, a number designated in advance by the user) of the elements whose values satisfy a predetermined condition, and selects the combination of these elements as the target elements (FIG. 4).

Figure 6:
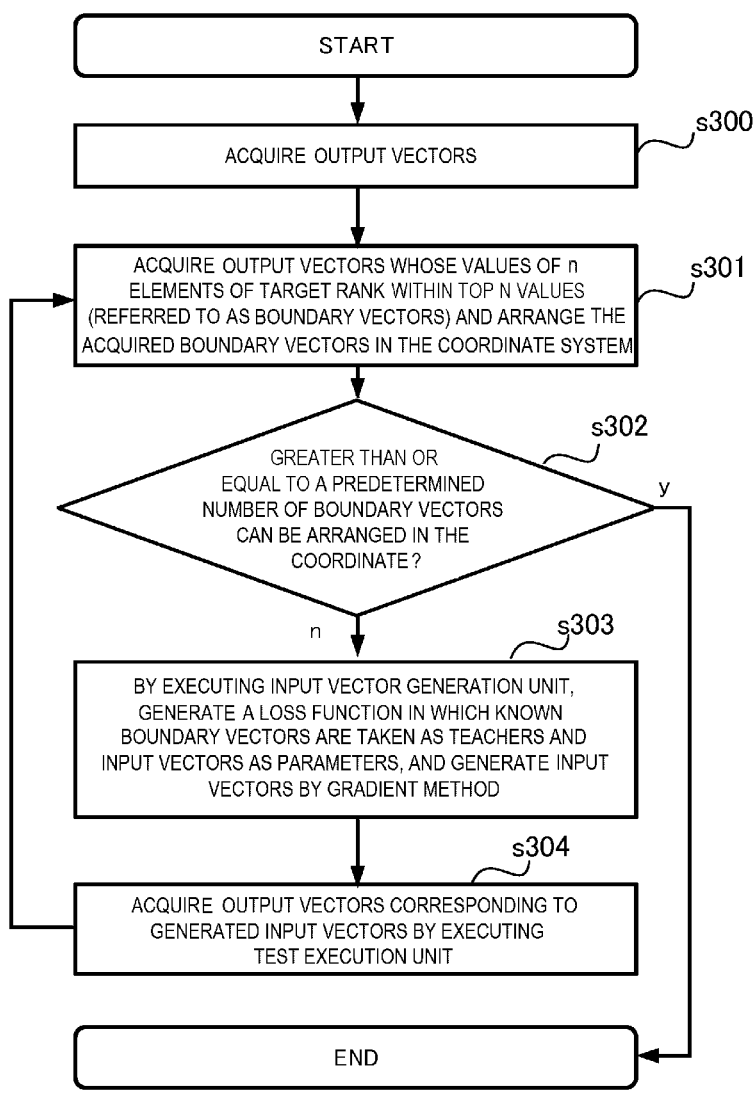
FIG. 6 is a diagram illustrating an exemplary flow 3 of the boundary search test support method according to the embodiment.

In the coordinate system which takes each of the target elements as a coordinate axis, the boundary vector acquisition unit 117 specifies, among the output vectors 1141, target elements whose values rank no lower than a predetermined ranking among the output vectors (no lower than the ranking corresponding to the number of the target elements, and no lower than 2nd when the number of target elements is "2") as boundary vectors, and arranges the boundary vectors in the coordinate system (FIG. 6). When the number of the specified boundary vectors is less than a predetermined reference (the number of target elements), a loss function is generated in which known boundary vectors is taken as teachers and the input vectors as parameters. New input vectors are generated by applying a gradient method to the loss function, and the test which takes the input vectors as inputs is performed to generate new output vectors which are taken as specific processing targets of the boundary vectors.

Figure 7:
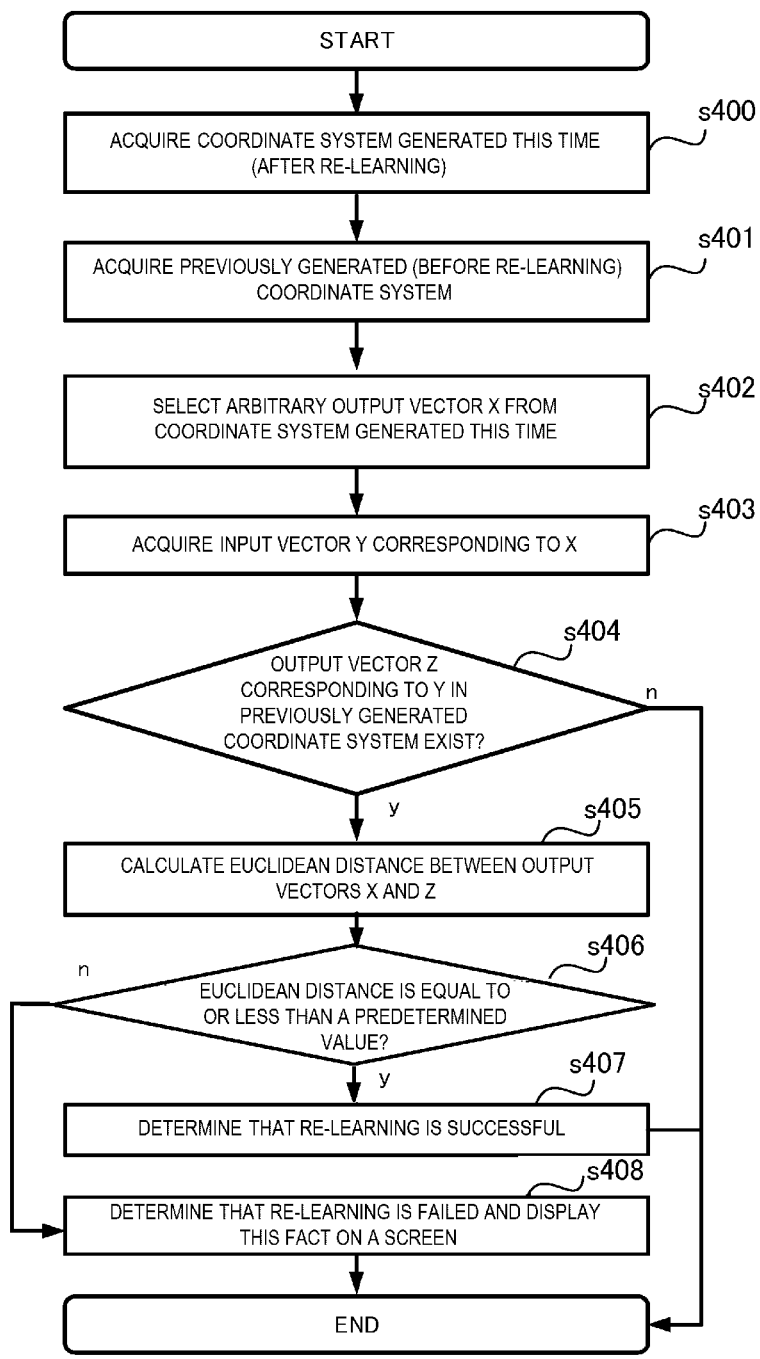
FIG. 7 is a diagram illustrating an exemplary flow 4 of the boundary search test support method according to the embodiment.

The boundary vector evaluation unit 118 calculates a distance between the boundary vectors in the coordinate system before and after learning of the test target program 1101, determines that the learning has failed when the distance is no lower than a predetermined threshold, and outputs the result to a predetermined device (FIG. 7).

Figure 8:
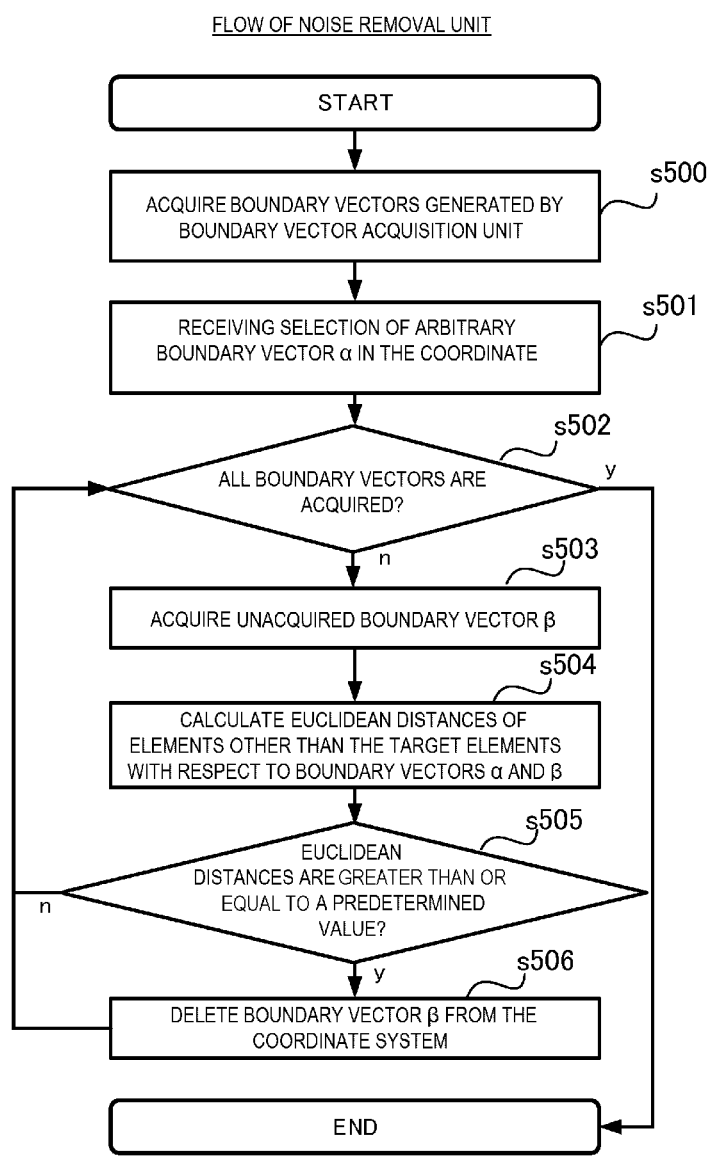
FIG. 8 is a diagram illustrating an exemplary flow 5 of the boundary search test support method according to the embodiment.

Among the boundary vectors, the noise removal unit 119 calculates, for elements other than the target elements, the Euclidean distance between a user-designated boundary vector and each of the other boundary vectors, and deletes boundary vectors whose Euclidean distance exceeds a predetermined threshold value from the coordinate system (FIG. 8).

Figure 10:
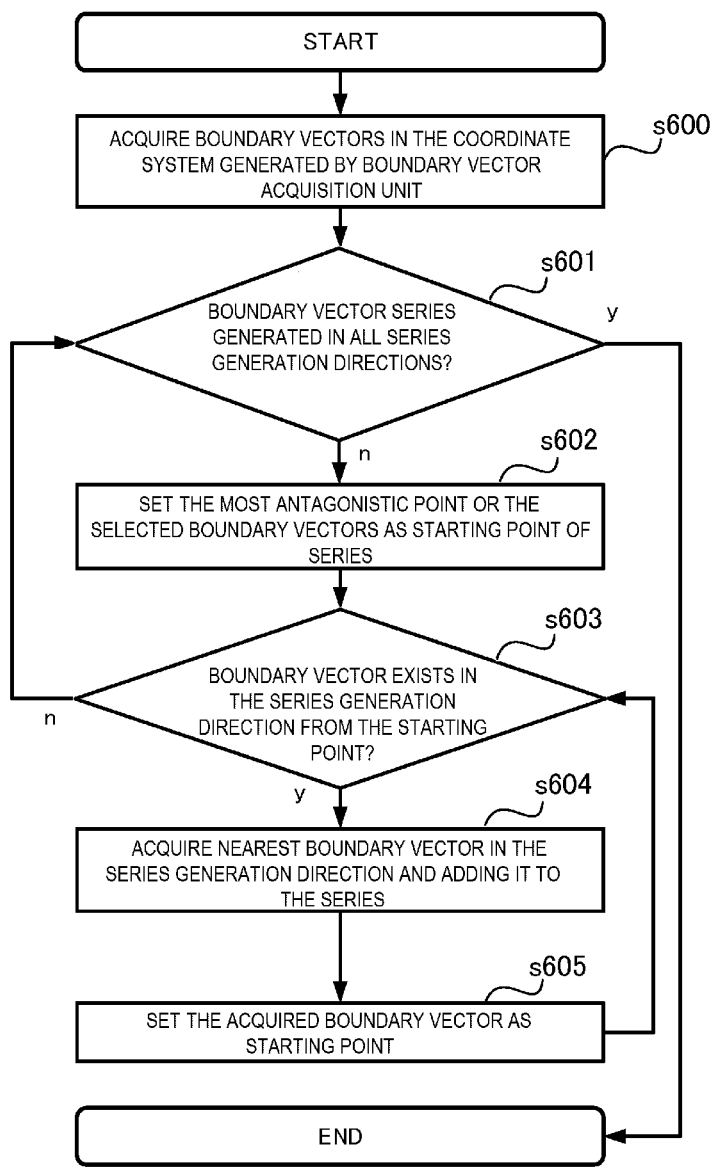
FIG. 10 is a diagram illustrating an exemplary flow 6 of the boundary search test support method according to the embodiment.

In the coordinate system, the boundary vector series generation unit 120 generates quadrants corresponding to the increase and decrease tendencies of the target elements around the most antagonistic point or a predetermined boundary vector designated by the user, generates boundary vector series 1221 by connecting the boundary vectors toward a positive direction according to the increase and decrease tendencies of the respective elements in each of the quadrants, and stores this information in the boundary vector series holding unit 122 (FIG. 10).

The coordinate system display unit 121 displays the coordinate system generated by the coordinate system generation unit 115 on a screen by an output device.

The boundary vector series holding unit 122 holds the boundary vector series generated by the boundary vector series generation unit 120.

The boundary vector series display unit 123 displays the boundary vector series generated by the boundary vector series generation unit 120 on a screen by the output device.

Figure 13:
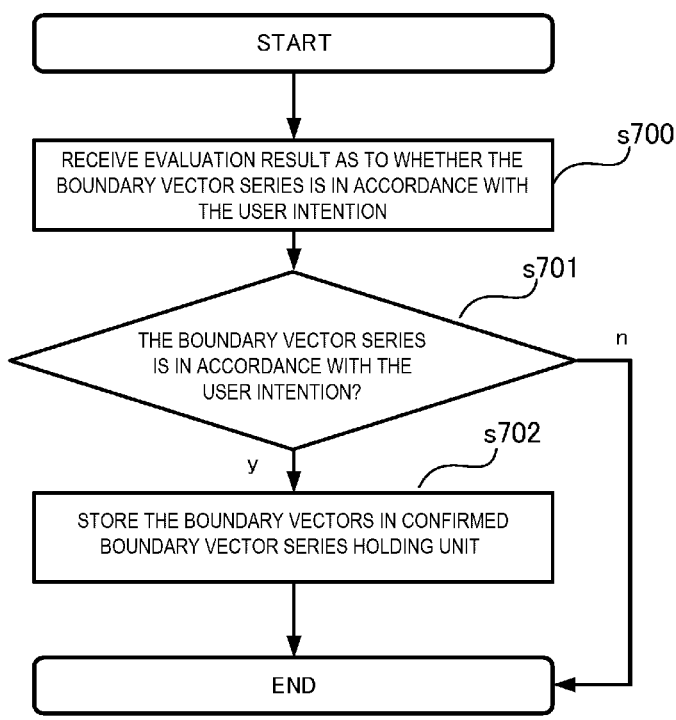
FIG. 13 is a diagram illustrating an exemplary flow 7 of the boundary search test support method according to the embodiment.

The boundary vector series confirmation result receiving unit 124 acquires a user evaluation result related to validity of the boundary vector series 1221 generated with respect to the input vectors 1111 from the input device, associates the user evaluation result with the information of the boundary vector series, and stores the user evaluation result in the confirmed adjacent vector series holding unit 125 of an external storage device 101 (FIG. 13).

As described above, the confirmed adjacent vector series holding unit 125 holds the user evaluation result in association with the information of the boundary vector series.

After the user evaluation result is acquired and stored by the boundary vector series confirmation result receiving unit 124, the boundary vector series evaluation unit 126 determines correctness of the boundary vector series 1221 newly generated with respect to the input vectors 1111, based on the information of the stored boundary vector series and the user evaluation result (FIG. 14). The boundary vector series evaluation unit 126 acquires the series of the output vectors 1141 by inputting the series of the input vectors 1111 in which the value of a predetermined first element of the target elements gradually increases and the value of a predetermined second element of the target elements gradually decreases, as the input vectors 1111, to the test target program 1101, arranges the output vectors 1141 in the coordinate system, and evaluates whether the output vectors 1141 fall within a predetermined range in the coordinate system.

—Hardware Configuration—

Figure 2:
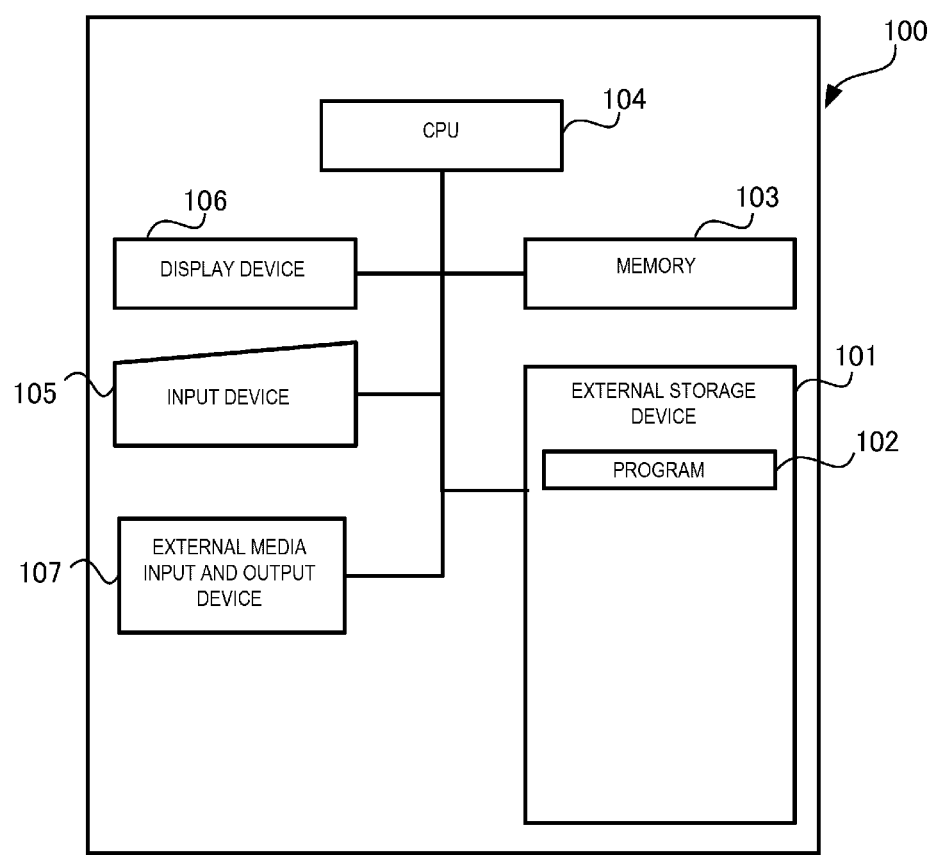
FIG. 2 is a diagram illustrating an exemplary hardware configuration of the boundary search test support device according to the embodiment.

The hardware configuration of the boundary search test support device 100 according to the embodiment is as follows. FIG. 2 is a diagram illustrating an exemplary hardware configuration of the boundary search test support device 100 according to the embodiment.

The boundary search test support device 100 according to the embodiment includes an external storage device 101, a memory 103, a CPU 104 (arithmetic device), an input device 105, an output device 106, and an external media input and output device 107.

Among them, the external storage device 101 is a storage unit constituted by, for example, appropriate nonvolatile memory elements such as an SSD (Solid State Drive) or a hard disk drive.

The memory 103 is a storage unit constituted by volatile memory elements such as RAM.

The CPU 104 is an arithmetic device that performs executions such as reading a program 102 held in the memory device 101 into the memory 103, performs overall control of the device itself, and performs various determinations, calculations and control processes.

The input device 105 is an input device that receives key input and voice input from an appropriate user such as a person in charge of the boundary search test.

The output device 106 is a display device such as a display that displays processing data.

The external media input and output device 107 is a device that includes an interface connectable to various storage medium such as a portable memory or a magnetic storage media and exchanges data with the storage medium. Information read from the storage medium by the external medium input and output device 107 is, for example, the test target program 1101, the input vectors 1111, and the like.

In addition to the program 102 for implementing functions necessary for the boundary search test support device 100 according to the embodiment, the external storage device 101 stores at least the test target program 1101, the input vectors 1111, the output vectors 1141, and the boundary vector series 1221. Detailed information will be described below.

—Exemplary Data Configuration—

Figures 3A, 3B:
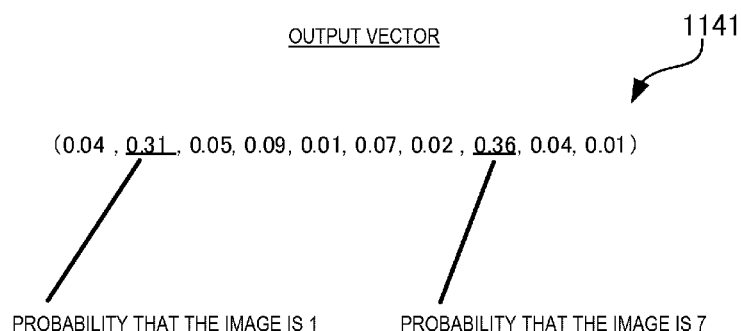
FIG. 3A is a diagram illustrating an example of input vectors according to the embodiment.
FIG. 3B is a diagram illustrating an example of output vectors according to the embodiment.

Subsequently, various types of information used by the boundary search test support device 100 according to the embodiment will be described. FIG. 3A illustrates an exemplary data configuration of the input vectors 1111 according to the embodiment.

The input vectors 1111 according to the embodiment are data appropriately read from an external medium and stored in the input vector holding unit 111 by the external medium input and output device 107.

The data configuration is a collection of records in which files of the input vectors and the expected output values are stored in association with each other. In the input vectors 1111 shown in FIG. 3A, images are taken as input vectors, and input vectors in which the number "1" drawn by the images is taken as an expected output value and input vectors in which the number "7" is taken as an expected output value are shown.

Next, FIG. 3B illustrates an exemplary data configuration of the output vectors 1141 according to the embodiment. The output vectors 1141 according to the embodiment are the output values generated by the test target program 1101 to which the input vectors 1111 are input. The data configuration is a collection of records in which the output values are associated with the input vectors respectively.

FIG. 3B shows an example of the output vectors 1141, which includes values of respective elements output by the test target program 1101 with respect to the input vectors 1111. Here, the "elements" are drawn by the images which are the input vectors, and respectively correspond to numbers "0" to "9" which are the image recognition results. The output vectors 1141 are constituted by values of probabilities of respective elements which are element numbers "0" to "9" determined by the test target program 1101.

As shown in the example in FIG. 3B, among the numbers "0" to "9" drawn by the images which are the input vectors 1111, the probability of "1" is "0.31" and the probability of "7" is "0.36", and results determined by the test target program 1101 are shown when the results are similar to this.

The output vectors 1141 correspond to results of a predetermined number of tests executed by the test execution unit 113 of the boundary search test support device 100 by sequentially inputting the input vectors 1111 to the test target program 1101.

—Exemplary Flow 1—

Hereinafter, the actual procedure of the boundary search test support method according to the embodiment will be described with reference to drawings. Various operations corresponding to the boundary search test support method described below are realized by the program 102 that is executed by the boundary search test support device 100 that reads out the program to a memory or the like. Further, the program 102 is constituted by codes for performing the various operations described below.

FIG. 4 is a diagram illustrating an exemplary flow 1 of the boundary search test support method according to the embodiment. Before the start of this flow, the test execution unit 113 reads the input vectors 1111 from the input vector holding unit 111, inputs the input vectors 1111 to the test target program 1101 to execute the program, and stores the output vectors 1141 which are the test results in the output vector holding unit 114.

In this case, the boundary search target element determination unit 116 of the boundary search test support device 100 receives user designation from the input device 105 to determine how many elements among the elements constituting the output vectors 1141 (for example, numbers "0" to "9" which are results of image recognition for the images which are taken as the input vectors 1111) will be taken as the target elements (s100). Here, the value of element quantity received as the user designation is taken as "n".

Subsequently, the boundary search target element determination unit 116 determines whether all the output vectors are acquired from the output vector holding unit 114 and are processed (s101).

As a result of the determination, when all the output vectors are acquired and processed (s101: y), the boundary search target element determination unit 116 ends the flow.

Meanwhile, as a result of the determination, when not all the output vectors are acquired and processed (s101: n), the boundary search target element determination unit 116 accesses the output vector holding unit 114 and acquires the unprocessed output vectors 1141 (s102).

Each time the processing of this flow is performed on an output vector, the boundary search target element determination unit 116 assigns a processed flag to a corresponding output vector in the output vector holding unit 114.

Therefore, the boundary search target element determination unit 116 executes the determination of s101 and the acquisition of unprocessed output vectors 1141 in s102 based on presence or absence of the flag.

Next, the boundary search target element determination unit 116 determines whether values of the elements of the output vectors obtained in s102 satisfy a predetermined condition (s103).

As the predetermined condition, it can be assumed that the values are greater than or equal to a predetermined threshold value, and the values rank within top n values among the elements.

As a result of the determination, when n elements satisfying the predetermined condition cannot be specified (s103: n), the boundary search target element determination unit 116 returns the processing to s101.

Meanwhile, as a result of the determination, when n elements satisfying the predetermined condition can be specified (s103: y), the boundary search target element determination unit 116 selects the combination of the n elements as the target elements, holds information in, for example, the memory 103 (s104), and returns the processing to s101. Thereafter, the boundary search target elements determination unit 116 repeats s102 to s104 until all the output vectors 1141 of the output vector holding unit 114 are acquired and processed (s101: y) which is a result of the determination in s101, and then ends this flow.

—Exemplary Flow 2—

Subsequently, the flow of operations of the coordinate system generation unit 115 will be described. FIG. 5 is a diagram illustrating an exemplary flow 2 of the boundary search test support method according to the embodiment.

In this case, first, the coordinate system generation unit 115 acquires the information of the target elements (for example, the second element corresponding to "1" and the eighth element corresponding to "7" among the elements of the output vectors 1141) acquired in the exemplary flow 1 from the memory 103 (s200).

Subsequently, the coordinate system generation unit 115 generates a coordinate system which takes each of the target elements as a coordinate axis based on the information of the target elements acquired in s200, and displays the coordinate system on the display device 106 (s201). In the case of the above example, there are two target elements (n=2) which are the second element and the eighth element, so that a two-dimensional coordinate system which takes the second element as the x-axis and the eighth element as the y-axis can be generated.

In the coordinate system, the coordinate system generation unit 115 generates a straight line in which the target elements have the same value (s202). When the values of the target elements are taken as x1, x2, . . . , the straight line is expressed by the equation of x1=x2=.

Subsequently, in the coordinate system, the coordinate system generation unit 115 generates a hyperplane in which the sum of the values of the target elements is a predetermined value (s203). When the sum is "1" and the values of the target elements are taken as x1, x2, . . . , the hyperplane is expressed by the equation of x1+x2+ . . . =1.

The coordinate system generation unit 115 specifies a most antagonistic point which is the intersection of the straight line and the hyperplane based on the respective equations, displays the most antagonistic point on the coordinate system (s204), and ends the flow. A known solution in mathematics may be employed to obtain the intersection of the straight line and the hyperplane.

—Exemplary Flow 3—

Subsequently, the flow of operations of the boundary vector acquisition unit 117 will be described. FIG. 6 is a diagram illustrating an exemplary flow 3 of the boundary search test support method according to the embodiment.

First, the boundary vector acquisition unit 117 acquires the output vectors 1141 of the output vector holding unit 114 (s300), specifies vectors whose values of the target elements rank within top n values (that is, higher than or equal to the ranking of the number of the target elements) among the output vectors as the boundary vectors, and arranges the boundary vectors in the coordinate system generated in the exemplary flow 2 (s301). In the specific example described above, the output vectors whose respective values of the second element and the eighth element rank within top 2 values among the output vectors 1141 are specified as the boundary vectors.

Subsequently, as a result of s301 executed so far, the boundary vector acquisition unit 117 determines whether a predetermined number of the boundary vectors can be arranged in the coordinate system (s302). The predetermined number is arbitrary, and is set in advance by the user.

As a result of the determination, when the predetermined number of the boundary vectors can be arranged in the coordinate system (s302: y), the boundary vector acquisition unit 117 ends the flow.

Meanwhile, as a result of the determination, when the predetermined number of boundary vectors could not be arranged in the coordinate system (s302: n), the boundary vector acquisition unit 117 generates a loss function in which the known boundary vectors (specified and arranged in S301) are taken as teachers and the input vectors 1111 as parameters, generates new input vectors by applying the gradient method to the loss function, and performs the test which takes the input vectors as inputs to generate new output vectors 1141 which are taken as the specific processing targets of the boundary vectors (s303).

The boundary vector acquisition unit 117 inputs the input vectors 1111 obtained in s303 to the test target program 1101 to execute the program, acquires new output vectors 1141 (s304), and returns the processing to s301.

The boundary vector acquisition unit 117 repeatedly executes s301 to s304 described above appropriately until a predetermined number of boundary vectors can be arranged in the coordinate system (s302: y), and then ends the processing.

—Exemplary Flow 4—

Subsequently, the flow of the operations of the boundary vector evaluation unit 118 will be described. FIG. 7 is a diagram illustrating an exemplary flow 4 of the boundary search test support method according to the embodiment.

In this case, first, the boundary vector evaluation unit 118 acquires the information of the coordinate system generated in the exemplary flow 3 from the memory 103 (s400), and similarly acquires information of the previously generated coordinate system from the memory 103 (s401). Each time a coordinate system is generated, the boundary search test support device 100 according to the embodiment stores various kinds of information related to the coordinate system in the memory 103 or the external storage device 101.

The boundary vector evaluation unit 118 selects an arbitrary output vector 1141 by randomly selecting from the information of the coordinate system obtained in s400 (s402).

Subsequently, the boundary vector evaluation unit 118 acquires the input vector 1111 which is the origin of the output vector 1141 selected in s402 described above from the input vector holding unit 111 (s403).

In the previously generated coordinate system, the boundary vector evaluation unit 118 determines whether there is the output vector 1141 taking the input vector 1111 acquired in s403 described above as input by searching the memory 103 or the external storage device 101 (s404).

As a result of the determination, when the relevant output vector 1141 does not exist (s404: n), the boundary vector acquisition unit 117 ends the processing.

Meanwhile, as a result of the determination, when there is the relevant output vector 1141 (s404: y), the boundary vector acquisition unit 117 calculates the Euclidean distance between the output vector 1141 selected in s402 and the output vector 1141 that can be specified by the search of s404 (s405).

The boundary vector evaluation unit 118 determines whether the Euclidean distance calculated in s405 described above is equal to or less than a predetermined reference value (s406).

As a result of the determination, when the Euclidean distance is not equal to or less than the reference value (s406: n), the boundary vector acquisition unit 117 determines that the learning of the test target program 1101 in the nearest time is failed (s408), displays this fact in the display device 106, and ends the processing.

Meanwhile, as a result of the determination, when the Euclidean distance is equal to or less than the reference value (s406: y), the boundary vector acquisition unit 117 determines that the learning of the test target program 1101 in the nearest time is successful (s407), and ends the processing.

—Exemplary Flow 5—

Subsequently, the flow of the operations of the noise removal unit 119 will be described. FIG. 8 is a diagram illustrating an exemplary flow 5 of the boundary search test support method according to the embodiment.

In this case, first, the noise removal unit 119 acquires the boundary vectors generated by the boundary vector acquisition unit 117 in the exemplary flow 3 (FIG. 6) (s500).

Subsequently, the noise removal unit 119 receives a user designation by the input device 105 with respect to an arbitrary boundary vector obtained in s500 (s501). Here, the boundary vector designated by the user is taken as "α".

The noise removal unit 119 extracts boundary vectors other than "α" among the boundary vectors obtained in s500, and determines whether each of the subsequent steps s503 to s506 is performed on the extracted boundary vectors (s502).

As a result of the determination, when all of the boundary vectors other than "α" among the boundary vectors obtained in s500 are processed by the subsequent steps s503 to s506 (s502: y), the noise removal unit 119 ends the processing.

Meanwhile, as a result of the determination, when the boundary vectors other than "α" among the boundary vectors obtained in s500 does not complete the subsequent steps s503 to s506 (s502: n), the noise removal unit 119 acquires this boundary vector (s503). The boundary vector acquired here is taken as "β".

The noise removal unit 119 calculates the Euclidean distances, for the elements other than the target elements, between the boundary vector "α" and the boundary vector "β" (s504).

Subsequently, the noise removal unit 119 determines whether the Euclidean distances calculated in s504 described above exceed a predetermined threshold (s505).

As a result of the above determination, when the calculated Euclidean distances do not exceed the predetermined threshold (s505: n), the noise removal unit 119 returns the processing to s502.

Meanwhile, as a result of the determination, when the calculated Euclidean distances exceed the predetermined threshold (s505: y), the noise removal unit 119 deletes the boundary vector "β" from the coordinate system (s506), and returns the processing to s502.

The noise removal unit 119 repeatedly executes s503 to s506 appropriately until all the boundary vectors are acquired and processed (s502: y), and then ends the processing.

Figure 9:
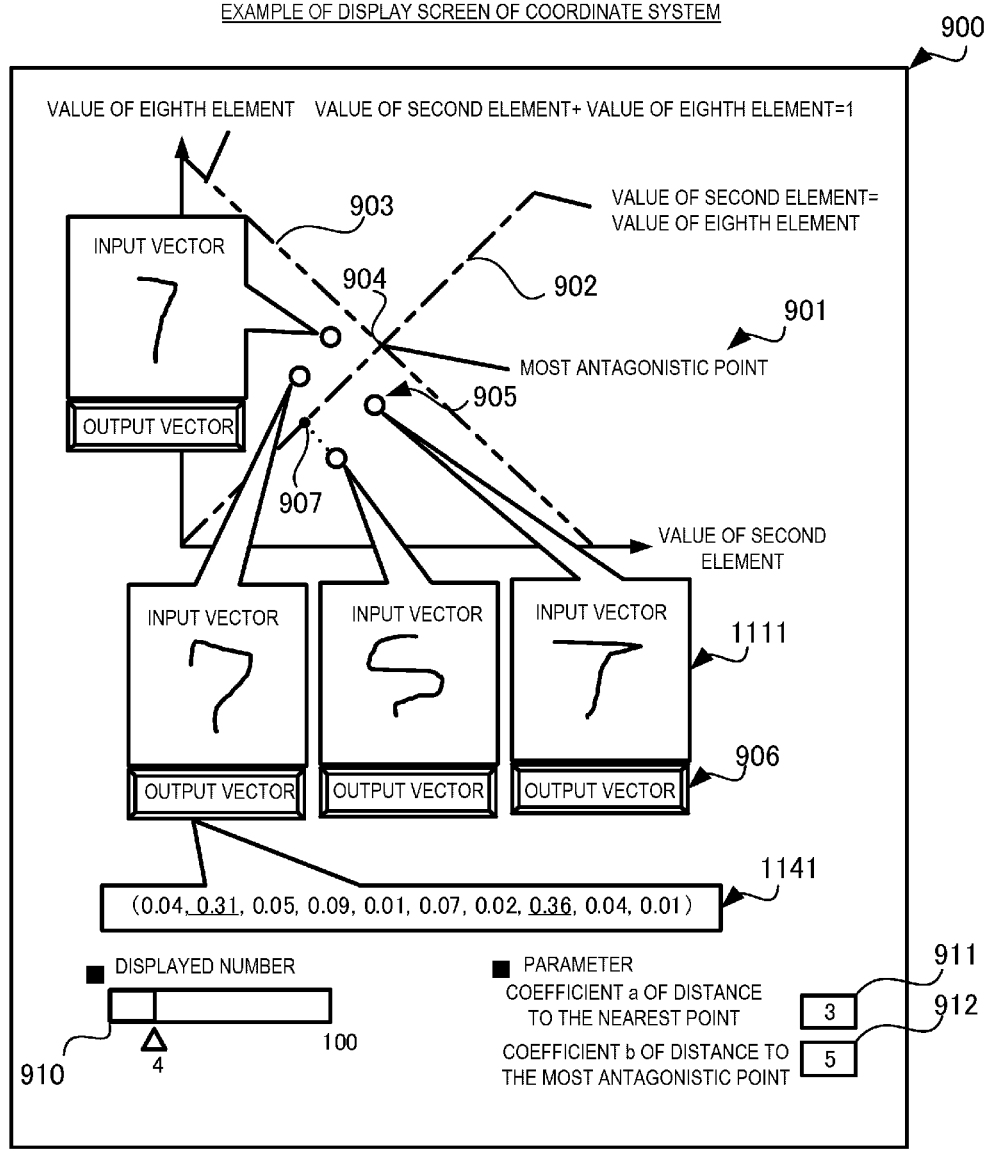
FIG. 9 is a diagram illustrating an exemplary output screen 1 according to the embodiment.

The coordinate system in which the boundary vectors "β" are deleted and only appropriate boundary vectors are arranged can be assumed to be, for example, in a display state shown in FIG. 9. The screen 900 illustrated in FIG. 9 is an example in which the coordinate system display unit 121 of the boundary search test support device 100 displays a coordinate system 901 on the display device 106 after receiving the processing result of the noise removal unit 119.

The coordinate system display unit 121 arranges the straight line 902, the hyperplane 903, the most antagonistic point 904, and the boundary vectors 905 in the coordinate system 901 which takes the target elements as coordinate axes, and displays the coordinate system 901 on the display device 106.

On the screen 900, the coordinate system display unit 121 displays the input vectors 1111 (the images in which numbers are drawn in the embodiment) corresponding to respective boundary vectors 905 and values (values of the corresponding output vectors 1141) of respective elements of the boundary vectors 905. The input vectors 1111, for example, may be pop-up displayed when the user operates the input device 105 to mouse over the boundary vectors 905. Similarly, the values of the output vectors 1141, for example, may be pop-up displayed when the user operates the input device 105 to mouse over the icons 906 of the output vectors.

As a method of eliminating noise parts in the boundary vector 905, the noise removal unit 119 may employ the concept modified based on that shown in the flow of FIG. 8.

In this case, the noise removal unit 119 receives each value by the input device 105 and through a slider bar 910 which receives the designation of the displayed number of the boundary vectors in the coordinate system 901, an input field 911 of a coefficient "a" (first coefficient) related to distances from the boundary vectors 905 to respective nearest points 907 in the straight line 902, and an input field 912 of a coefficient "b" (second coefficient) related to distances from the nearest points 907 of the boundary vectors 905 to the most antagonistic point 904. The slider bar 910, the input field 911, and the input field 912 are displayed on the screen 900.

Among the coefficients described above, the coefficient "a" related to the distances from the boundary vectors 905 to the respective nearest points 907 in the straight line 902 has a property of being large when emphasis is placed on the fact that the values of the target elements are close to each other. In the specific example described above, the coefficient "a" increases when emphasis is placed on the boundary vectors in which the value of "1" of the second element is close to the value of "7" of the eighth element, that is, probabilities that numbers image-recognized from the input vectors are "1" or "7" are close.

The coefficient "b" related to the distances from the respective nearest points 907 of the boundary vectors 905 to the most antagonistic point 904 has a property of being large when emphasis is placed on the fact that each value of the target elements is large (ranking high among the elements) instead of the fact that the values of the target elements are close. In the specific example described above, the coefficient "b" increases when emphasis is placed on the boundary vectors in which the value of "1" of the second element and the value of "7" of the eighth element are both larger than the values of the other elements, that is, both probabilities that the numbers image-recognized from the input vectors are "1" or "7" are large.

The noise removal unit 119 adds values obtained by multiplying the distances between the boundary vectors 905 and the respective nearest points 907 by the coefficient "a" and values obtained by multiplying the distances between the closest points 907 of the boundary vectors 905 and the most antagonistic point 904 by the coefficient "b" together, and arranges the boundary vectors whose quantity is the displayed number in the coordinate system 901 in an ascending order of the sums.

—Exemplary Flow 6—

Subsequently, the flow of operations of the boundary vector series generation unit 120 will be described. FIG. 10 is a diagram illustrating an exemplary flow 6 of the boundary search test support method according to the embodiment.

In this case, the boundary vector series generation unit 120 acquires information of the boundary vectors 905 from the coordinate system 901 generated by the boundary vector acquisition unit 117 (s600).

Subsequently, the boundary vector series generation unit 120 determines whether each of the subsequent steps s602 to s605 is performed to the boundary vectors 905 whose information is acquired in s600 (s601).

As a result of the determination, when the subsequent steps of s602 to s605 are performed to the boundary vectors 905 whose information is acquired in s600 (s601: y), the boundary vector series generation unit 120 ends the processing.

Meanwhile, as a result of the determination, when the subsequent steps of s602 to s605 are not completed to the boundary vectors 905 whose information is acquired in s600 (s601: n), the boundary vector series generation unit 120 sets the most antagonistic point 904 or the user-designated boundary vector 905 (hereinafter, designated boundary vector 9051) as a starting point in the coordinate system 901 (s602). The starting point is a starting point of the boundary vector series, and a starting point of the quadrants that defines the coordinate plane of the coordinate system 901.

Figure 12:
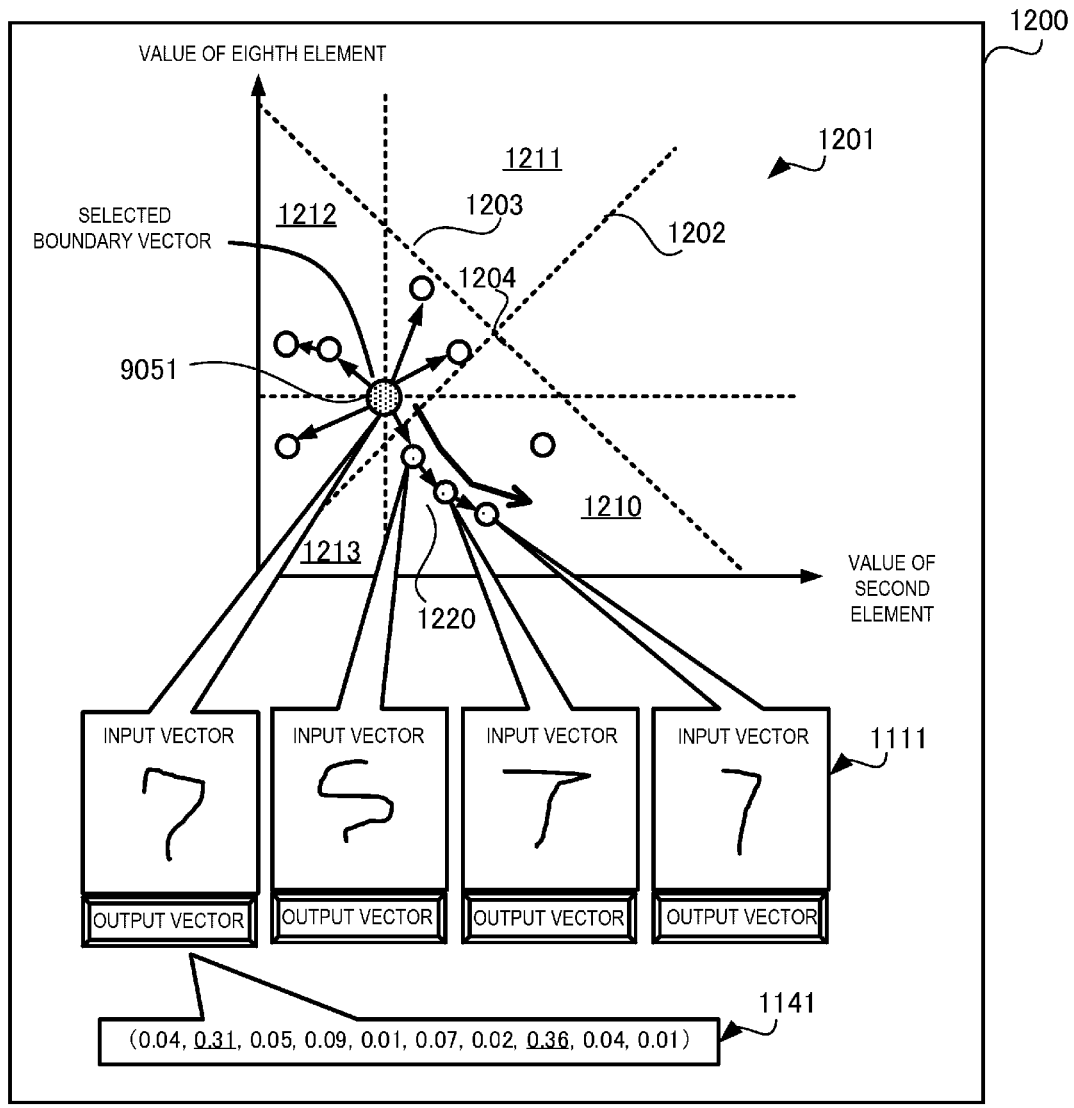
FIG. 12 is a diagram illustrating an exemplary output screen 2 according to the embodiment.

Here, the quadrants are regions corresponding to the increase and decrease tendencies of the target elements, and are obtained by partitioning the coordinate plane of the coordinate system 901 by the increase and decrease tendencies. For example, a quadrant 1210 showing a tendency that the value of the second element increases and the value of the eighth element decreases, a quadrant 1211 showing a tendency that both the value of the second element and the value of the eighth element increase, a quadrant 1212 showing a tendency that the value of the second element decreases and the value of the eighth element increases, and a quadrant 1213 showing a tendency that both the value of the second element and the value of the eighth element decrease, and the like can be assumed (see FIG. 12 for each one).

Subsequently, the boundary vector series generation unit 120 determines among the boundary vectors 905 acquired in s600 whether there is a boundary vector 905 in the quadrants 1210 to 1213 as seen from the most antagonistic point 904 or the designated boundary vector 9051 (s603).

As a result of the determination, when there is no boundary vector 905 (s603: n), the boundary vector series generation unit 120 returns the processing to s601.

Meanwhile, as a result of the determination, when there is the boundary vector 905 which can be specified (s603: y), the boundary vector series generation unit 120 selects a boundary vector 905 having the closest Euclidean distance to the most antagonistic point 904 or the specified boundary vector 9051 from the boundary vectors 905 that can be specified by the determination of s603 in the corresponding quadrant, and adds the selected boundary vector 905 to a series which starts from the nearest point 904 or the designated boundary vector 9051 (s604).

In this case, as shown in a coordinate system 1201 (FIG. 12) of the screen 1200, the boundary vector series generation unit 120 connects the designated boundary vector 9051 and an added boundary vector with a directed line segment such as an arrow to generate the boundary vector series 1220.

The boundary vector series generation unit 120 sets the boundary vector added to the boundary vector series at s604 as a new starting point (s605), and returns the processing to s603.

The boundary vector series generation unit 120 executes the processing of s601 to s605 for all boundary vectors acquired in s600, repeatedly executes s601 to s605 appropriately until the boundary vector series 1220 are generated in each quadrant by connecting the boundary vectors 905 toward a positive direction based on the increase and decrease tendencies of respective elements (s601: y), and then ends the processing.

An example of the boundary vector series generated by the above-described flow is shown in FIG. 11. As shown herein, the information of the boundary vector series 1220 held by the boundary search test support device 100 is configured such that the values of the output vectors constituting the boundary vector series and the numbers of the corresponding input vectors are associated accordingly with respect to the boundary vector series including a "series whose direction is (+, +)" corresponding to the quadrant 1211 in which both values of the second element and the eighth element increase, a "series whose direction is (+, -)" corresponding to the quadrant 1210 in which the value of the second element increases and the value of the eighth element decreases, a "series whose direction is (-, +)" corresponding to the quadrant 1212 in which the value of the second element decreases and the value of the eighth element increases, and a "series whose direction is (-, -)" corresponding to the quadrant 1213 in which both values of the second element and the eighth element decrease.

—Exemplary Flow 7—

Subsequently, the flow of operations of the boundary vector series confirmation result receiving unit 124 will be described. FIG. 13 is a diagram illustrating an exemplary flow 7 of the boundary search test support method according to the embodiment.

In this case, the boundary vector series confirmation result receiving unit 124 acquires the user evaluation result from the input device 105. The user evaluation result relates to validity of the boundary vector series 1220 generated with respect to the input vector 1111 (s700).

In addition, the boundary vector series confirmation result receiving unit 124 determines whether the user evaluation result obtained in s700 is in accordance with the user intention that "the boundary vector series is valid" (s701).

As a result of the determination, when the user evaluation result is not in accordance with the user intention (s701: n), the boundary vector series confirmation result receiving unit 124 ends the processing.

Meanwhile, as a result of the determination, when the user evaluation result is in accordance with the user intention (s701: y), the boundary vector series confirmation result receiving unit 124 stores the information of the boundary vector series 1220 that has received the user evaluation result in the confirmed boundary vector series holding unit 125 (s702), and ends the processing. Therefore, although not particularly illustrated, information of the boundary vector series corresponding to the user intention is stored in the confirmed boundary vector series holding unit 125.

—Exemplary Flow 8—

Subsequently, the flow of the operations of the boundary vector series evaluation unit 126 will be described. FIG. 14 is a diagram illustrating an exemplary flow 8 of the boundary search test support method according to the embodiment.

In this case, for example, each time the boundary vector series generation unit 120 generates a boundary vector series 1220, the boundary vector series evaluation unit 126 acquires the boundary vector series as an evaluation target (s800).

The boundary vector sequence evaluation unit 126 acquires the boundary vector series acquired in s800 and the previous boundary vector series that have the same increase and decrease tendency of the value of the target elements, that is, the same quadrant, and that stored in the confirmed vector series holding unit 125 (s801).

Subsequently, the boundary vector series evaluation unit 126 calculates the cosine similarity for all the elements between the boundary vector series which is the evaluation target and the previous boundary vector series acquired in s801 (s802).

From the calculation results in the above-described s802, the boundary vector series evaluation unit 126 determines whether the similarity between the boundary vector series which is the evaluation target and the previous boundary vector series acquired in s801 is higher than or equal to a predetermined reference (s803).

As a result of the above determination, when the similarity is equal to or less than the reference (s803: y), the boundary vector series evaluation unit 126 determines that the boundary vector series which is the evaluation target is not in accordance with the user intention, displays this fact, for example, on output device 106, and ends the processing.

Meanwhile, as a result of the determination, when the similarity exceeds the reference (s803: n), the boundary vector series evaluation unit 126 determines that the boundary vector series which is the evaluation target is in accordance with the user intention, displays this fact, for example, on the output device 106 (s804), and ends the processing.

—Exemplary Flow 9—

Subsequently, the flow of operations of the boundary vector series evaluation unit 126 will be described. FIG. 15 is a diagram illustrating an exemplary flow 9 of the boundary search test support method according to the embodiment.

In this case, the boundary vector series evaluation unit 126 searches for a group (input vector series) of the input vectors 1111 in which the value of the predetermined first element of the target elements gradually increases and the value of the predetermined second element of the target elements gradually decreases in the input vector holding unit 111 (s900).

The boundary vector series evaluation unit 126 searches the output vector holding unit 114 for the output vectors 1141 corresponding to the input vectors 1111 searched in s900, and specifies the output vectors 1141 which are arranged in the coordinate system 901 as the boundary vectors (s901).

Subsequently, the boundary vector series evaluation unit 126 specifies the boundary vector series 1220 formed by the boundary vectors 905 specified in s901 described above in the boundary vector series holding unit 122 (s902).

The boundary vector series evaluation unit 126 determines whether the output vectors 1141 included in the boundary vector series 1220 specified in s902 fall in a range surrounded by two predetermined parallel straight lines in the coordinate system 901 (s903), for example. The two straight lines can be expressed by equations of $y=-x+a$, $y=-x-a$, or the like as examples.

As a result of the determination, when the output vectors 1141 included in the boundary vector series 1220 specified in s902 do not fall in the range surrounded by the two predetermined parallel straight lines in the coordinate system 901 (s903: n), the boundary vector series evaluation unit 126 determines that the boundary vector series 1220 is not in accordance with the user intention (s906), displays this fact, for example, on the output device 106, and ends the processing.

Meanwhile, as a result of the determination, when the output vectors 1141 included in the boundary vector series 1220 specified in s902 fall in the range surrounded by the two predetermined parallel straight lines in the coordinate system 901 (s903: y), the boundary vector series evaluation unit 126 further determines whether the number of differences between a connection order of input vectors constituting the input vector series (acquired in s900) and a connection order of output vectors constituting the output vector series 1220 which is the test result corresponding to these input vectors is higher than or equal to a predetermined reference (for example, 2) (s904).

For example, it is assumed that the input vectors constituting the input vector series are in a connection order of an input vector "#1", an input vector "#5", an input vector "#3", and an input vector "#8". The ID such as "#1" is identification information. Meanwhile, it is assumed that the output vectors of the output vector series 1220 corresponding to these input vectors are in a connection order of an output vector "#1", an input vector "#3", an input vector "#5", and an input vector "#8". It is assumed that IDs assigned to the output vectors are the same with those of the corresponding input vectors. In this case, there is one difference between the connection orders of the input vector series and the output vector series, that is, "#3" and "#5" are interchanged.

As a result of the determination, when the number of differences between the connection order of the input vectors constituting the input vector series and the connection order of the output vectors constituting the output vector series 1220 which is the test result corresponding to these input vectors exceeds the predetermined reference (s904: n), the boundary vector series evaluation unit 126 determines that the boundary vector series 1220 is not in accordance with the user intention, displays this fact, for example, on the output device 106 (s906), and ends the processing.

Meanwhile, as a result of the determination, when the number of differences between the connection order of the input vectors constituting the input vector series and the connection order of the output vectors constituting the output vector series 1220 which is the test result corresponding to these input vectors is equal to or less than the predetermined reference (s904: y), the boundary vector series evaluation unit 126 determines that the boundary vector series 1220 is in accordance with the user intention, displays this fact, for example, on the output device 106 (s905), and ends the processing.

Although the preferred mode for carrying out the invention and the like has been specifically described above, the invention is not limited thereto and various modifications can be made without departing from the gist thereof.

According to the embodiment, it is possible to efficiently detect the boundary points at which the output values change in the program created by machine learning.

At least the following will be clarified by the description of this specification. That is, in the boundary search test support device according to the embodiment, the arithmetic device may further calculate the Euclidean distance for elements other than the plurality of elements between the predetermined boundary vector of the boundary vectors and the other boundary vectors, and delete a boundary vector among the other boundary vectors in which the Euclidean distance for a predetermined element exceeds the predetermined threshold from the coordinate system.

Accordingly, consideration can also be given to elements other than the plurality of elements corresponding to the expected values of the user in the output vectors, and elements with large differences with respect to the elements other than the expected values can be excluded from the boundary vectors. Consequently, it is possible to detect the boundary points at which the output values change in the program created by machine learning more efficiently.

In the boundary search test support device according to the embodiment, when the number of the plurality of the elements is equal to or less than 3, the arithmetic device may display the coordinate system on the output device, in which the straight lines, the hyperplane, the most antagonistic point, the boundary vectors, and the input vectors corresponding to the boundary vectors are respectively arranged, receive all values of the displayed number of the boundary vectors, the first coefficient related to the distances from the boundary vectors to the respective nearest points in the straight line, and the second coefficient related to the distances from the nearest points of the boundary vectors to the most antagonistic point by the input device, add the values obtained by multiplying the distances between the boundary vectors and the nearest points by the first coefficient and the values obtained by multiplying the distances between the nearest points of the boundary vectors and the most antagonistic point by the second coefficient together, and arrange the boundary vectors corresponding to the displayed number in the coordinate system 901 in an ascending order of the sums.

Accordingly, it is possible to receive the designation regarding the user's expected conditions including whether the plurality of elements are close to each other in value (first coefficient) and whether the plurality of elements are close to each other in value and large in value (second coefficient), and to specify the boundary vectors corresponding to the designation. Consequently, the boundary points at which the output values change in the program created by machine learning can be detected more efficiently.

In the boundary search test support device according to the embodiment, the arithmetic device may further execute a processing of generating the quadrants corresponding to the increase and decrease tendencies of the plurality of elements around the most antagonistic point or the predetermined boundary vector in the coordinate system and generating the boundary vector series by connecting the boundary vectors in the positive direction based on increase and decrease tendencies of respective elements in each of the quadrants, and a processing of displaying the boundary vector series and the information of the input vectors corresponding to the boundary vectors constituting the boundary vector series of the coordinate system on the output device.

Accordingly, it is possible to specify transition tendencies of output vectors related to the predetermined expected value as the boundary vector series and display the boundary vector series together with the input vectors on a screen. This can lead to improvement of learning accuracy by easily recognizing the tendency of the output vectors on the user side and reflecting the tendency in parameter modification of the corresponding program. Consequently, the boundary points at which the output values change in the program created by machine learning can be detected more efficiently.

In the boundary search test support device according to the embodiment, when the number of the boundary vectors is less than the predetermined reference, the arithmetic device may further execute a processing of generating a loss function in which the known boundary vectors are taken as teachers and the input vectors as the parameters, generating new input vectors by applying the gradient method to the loss function, and performing the test which takes the input vectors as inputs to generate new output vectors which are taken as the specific processing targets of the boundary vectors.

Accordingly, the learning accuracy can be improved by presenting an appropriate number of boundary vectors to the user, easily recognizing the tendencies of the output vectors, and reflecting the tendencies in the parameter modification of the corresponding program and the like. Consequently, the boundary points at which the output value change in the program created by machine learning can be detected more efficiently.

In the boundary search test support device according to the embodiment, the arithmetic device may further execute a processing of referring to the output vectors, and selecting the combination of the elements of the output vectors as the plurality of the elements when the values of the elements satisfy the predetermined condition.

Accordingly, receiving the designation of the user for the plurality of elements can be avoided. Consequently, the boundary points at which the output value change in the program created by machine learning can be detected more efficiently.

In the boundary search test support device according to the embodiment, the arithmetic device may further execute a processing of acquiring the user evaluation result related to the validity of the boundary vector series generated with respect to the input vectors from the predetermined device, associating the user evaluation result with the information of the boundary vector series, and storing the user evaluation result in the storage device, and a processing, after the storage, of determining the correctness of the boundary vector series newly generated with respect to the input vectors based on the information of the stored boundary vector series and the user evaluation result.

Accordingly, the boundary vector series which is taken as the output vectors can be efficiently evaluated with reference to the suitable boundary vector series which is the user evaluation result. Consequently, the boundary points at which the output values change in the program created by machine learning can be detected more efficiently.

In the boundary search test support device according to the embodiment, the storage device may further hold the input vector series in which the value of the predetermined first element of the plurality of the elements gradually increases and the value of a predetermined second element of the plurality of the elements gradually decreases, as the input vectors. The arithmetic device may further execute a processing of acquiring the output vector series by inputting the input vector series to the program generated by the neural network, arranging the output vectors in the coordinate system, and evaluating whether the output vectors fall in the predetermined range in the coordinate system.

Accordingly, it is possible to prevent the variation tendency of the output vectors from exceeding the variation range of the user expectation. Consequently, the boundary points at which the output values change in the program created by machine learning can be detected more efficiently.

In the boundary search test support device according to the embodiment, when the input vectors are image data, the arithmetic device may further execute a processing of generating the input vector series in which the value of the predetermined first element of the plurality of the elements gradually increases and the value of the predetermined second element of the plurality of elements gradually decreases by the morphing technology, and storing the input vector series in the storage device.

Accordingly, the input vectors can be efficiently generated. Consequently, the boundary points at which the output values change in the program created by machine learning can be detected more efficiently.

In the boundary search test support device according to the embodiment, the arithmetic device may further execute a processing of calculating the distance between the boundary vectors in the coordinate system before and after the learning of the program generated by the neural network, determining that the learning is failed when the distance is greater than or equal to the predetermined threshold, and outputting the result to the predetermined device.

Accordingly, the influence of the parameter correction for the program, that is, the learning, can be controlled not to become extreme. Consequently, the boundary points at which the output values change in the program created by machine learning can be detected more efficiently.

Although the present disclosure has been described with reference to example embodiments, those skilled in the art will recognize that various changes and modifications may be made in form and detail without departing from the spirit and scope of the claimed subject matter.

What is claimed is:

1. A boundary search test support device comprising:
   a storage device configured to store a plurality of predetermined input vectors; and
   a processor coupled to the storage device configured to execute:
   acquiring the plurality of input vectors from the storage device, executing a test by sequentially inputting the input vectors to a program generated by a neural network, and acquiring output vectors which are test results corresponding to the input vectors,
   generating a coordinate system having a respective element, of a predetermined plurality of the elements among the elements constituting the output vectors, as each coordinate axis of the coordinate system, respectively generating, in the coordinate system, a straight line in which the plurality of elements has a same value and a hyperplane in which a sum of values of the plurality of elements is taken as a predetermined value, and arranging a most antagonistic point which is an intersection point of the straight line and the hyperplane and boundary vectors whose values of the plurality of elements rank higher than or equal to a predetermined ranking among the output vectors in the coordinate system, and displaying the coordinate system together with input vectors corresponding to the boundary vectors on a predetermined output device, wherein when a number of the plurality of the elements is equal to or less than 3, the processor is configured to execute:

displaying the coordinate system on the output device, in which the straight line, the hyperplane, the most antagonistic point, the boundary vectors, and the input vectors corresponding to the boundary vectors are respectively arranged, and receiving, by the input device, a displayed number of the boundary vectors, a first coefficient related to distances from the boundary vectors to corresponding nearest points in the straight line, and a second coefficient related to distances from the nearest points of the boundary vectors to the most antagonistic point, adding values obtained by multiplying the distances between the boundary vectors and the nearest points by the first coefficient and the values obtained by multiplying the distances between the nearest points of the boundary vectors and the most antagonistic point by the second coefficient together, and arranging boundary vectors corresponding to the displayed number in the coordinate system in an ascending order of the sums.

2. The boundary search test support device according to claim 1, wherein
the processor is configured to execute:
calculating an Euclidean distance, for elements other than the plurality of elements, between a predetermined boundary vector of the boundary vectors and the other boundary vectors, and deleting a boundary vector among the other boundary vectors in which an Euclidean distance for a predetermined element exceeds a predetermined threshold from the coordinate system.

3. The boundary search test support device according to claim 1, wherein
the processor is configured to execute:
generating quadrants corresponding to increase and decrease tendencies of the plurality of elements around the most antagonistic point or a predetermined boundary vector in the coordinate system and generating a boundary vector series by connecting boundary vectors in a positive direction based on the increase and decrease tendencies of the elements in each of the quadrants, and
displaying the boundary vector series and information on input vectors corresponding to boundary vectors constituting the boundary vector series of the coordinate system on the output device.

4. The boundary search test support device according to claim 1, wherein
when a number of the boundary vectors is less than a predetermined reference, the processor is configured to execute:

generating a loss function in which known boundary vectors are taken as teachers and input vectors as parameters,
generating new input vectors by applying a gradient method to the loss function, and generating new output vectors by performing the test which takes the input vectors as inputs, in which the new output vectors are taken as specific processing targets of boundary vectors.

5. The boundary search test support device according to claim 1, wherein
the processor is configured to execute: a processing of referring to the output vectors and selecting, when values of elements of the output vectors satisfy a predetermined condition, a combination of the elements as the plurality of elements.

6. The boundary search test support device according to claim 3, wherein
the processor is configured to execute:
acquiring a user evaluation result related to validity of the boundary vector series generated with respect to the input vectors from a predetermined device, associating the user evaluation result with information on the boundary vector series, and storing the user evaluation result in the storage device, and
after the storage, determining correctness of a boundary vector series newly generated with respect to the input vectors based on the stored information on the boundary vector series and the stored user evaluation result.

7. The boundary search test support device according to claim 1, wherein
the storage device further stores an input vector series as the input vectors, in which a value of a predetermined first element of the plurality of elements gradually increases while a value of a predetermined second element of the plurality of elements gradually decreases, and
the processor is configured to execute: acquiring a series of output vectors by inputting the input vector series to the program generated by a neural network and arranging the output vectors in the coordinate system, and a processing of evaluating whether the output vectors fall in a predetermined range defined in advance in the coordinate system.

8. The boundary search test support device according to claim 7, wherein
when the input vectors are image data, the processor is configured to execute: generating, by a morphing technology, an input vector series in which, in the plurality of elements, the value of the predetermined first element gradually increases and the value of the predetermined second element gradually decreases, and storing the input vector series in the storage device.

9. The boundary search test support device according to claim 1, wherein
the processor is configured to execute: calculating a distance between the boundary vectors in the coordinate system before and after learning of the program generated by a neural network, determining that the learning is failed when the distance is greater than or equal to a predetermined threshold, and outputting the determination to the predetermined device.

10. A boundary search test support method of a boundary search test support device that comprises an information processing device including a storage device configured to store a plurality of predetermined input vectors, the method comprising the steps of:

acquiring the plurality of input vectors from the storage device, executing a test by sequentially inputting the input vectors to a program generated by a neural network, and acquiring output vectors which are test results corresponding to the input vectors, generating a coordinate system having a respective element, of a predetermined plurality of the elements among the elements constituting the output vectors, as each coordinate axis of the coordinate system, respectively generating, in the coordinate system, a straight line in which the plurality of elements has a same value and a hyperplane in which a sum of values of the plurality of elements is taken as a predetermined value, and arranging in the coordinate system a most antagonistic point which is an intersection point of the straight line and the hyperplane and boundary vectors whose values of the plurality of elements rank higher than or equal to a predetermined ranking among the output vectors, and displaying the coordinate system together with input vectors corresponding to the boundary vectors on a predetermined output device, wherein when a number of the plurality of the elements is equal to or less than 3, the method further comprising the steps of:

displaying the coordinate system on the output device, in which the straight line, the hyperplane, the most antagonistic point, the boundary vectors, and the input vectors corresponding to the boundary vectors are respectively arranged, and receiving, by the input device, a displayed number of the boundary vectors, a first coefficient related to distances from the boundary vectors to corresponding nearest points in the straight line, and a second coefficient related to distances from the nearest points of the boundary vectors to the most antagonistic point, adding values obtained by multiplying the distances between the boundary vectors and the nearest points by the first coefficient and the values obtained by multiplying the distances between the nearest points of the boundary vectors and the most antagonistic point by the second coefficient together, and arranging boundary vectors corresponding to the displayed number in the coordinate system in an ascending order of the sums.

* * * * *